Nov. 18, 1952　　　W. D. GARDELS　　　2,618,497
LOCKABLE TRUNK LID EXTENSION FOR AUTOMOBILES
Filed Sept. 21, 1949　　　2 SHEETS—SHEET 1

INVENTOR.
Walter D. Gardels
BY
ATTORNEY.

Nov. 18, 1952          W. D. GARDELS                    2,618,497
           LOCKABLE TRUNK LID EXTENSION FOR AUTOMOBILES
Filed Sept. 21, 1949                              2 SHEETS—SHEET 2

INVENTOR.
Walter D. Gardels
BY
ATTORNEYS

Patented Nov. 18, 1952

2,618,497

UNITED STATES PATENT OFFICE 2,618,497

LOCKABLE TRUNK LID EXTENSION FOR AUTOMOBILES

Walter D. Gardels, Kansas City, Mo.

Application September 21, 1949, Serial No. 117,030

2 Claims. (Cl. 292—265)

This invention relates to devices for use with containers having closures as a means for holding the closure partially open and at the same time for limiting movement of the closure along its path of travel in either direction with respect to the container away from such partially open condition.

For purposes of explanation, owners and users of automobiles are generally well aware of the fact that it oftentimes becomes desirable to utilize the trunk while maintaining the lid thereof partially open. A most notable example is that of transporting small animals, fowl or the like in the trunk where it becomes necessary to vent such trunk to provide air for the animals or fowl. Improvised means such as inserting a block between the trunk lid and the automobile body, together with additional fastening means such as ropes for holding the lid downwardly and against opening during transport, may well be used but, of course, is not desirable.

Additionally, it is impossible to positively lock the trunk lid against further opening by use of such improvised paraphernalia.

It is accordingly the most important object of the present invention to provide a device adaptable for interpositioning between the trunk lid of an automobile and the body adjacent the trunk and having means on the ends thereof for interengagement with parts of the trunk lid and parts of the body whereby to hold the lid against further movement in either direction.

Another important object of the present invention is to provide a device of the aforementioned character wherein the elements of the spanning member are each adapted for interlocking with parts of the trunk lock whereby the lid is supported and held against further swinging movement with respect to the trunk and the device forming the subject matter hereof is also held in place and against displacement while in use.

A further object of the present invention is to provide an extension member adapted for use as above set forth wherein the same is formed at its ends to permit the operator to lock the trunk in the usual manner with the lid thereof partially open and with the assurance that intruders cannot disengage the said device with respect to the automobile body and the trunk lid and thereby gain access to the trunk.

Other objects of this invention relate to the way in which the device hereof is formed for adaptability through slight changes in construction thereof to virtually any type of automobile trunk and lid assembly.

Figure 1:
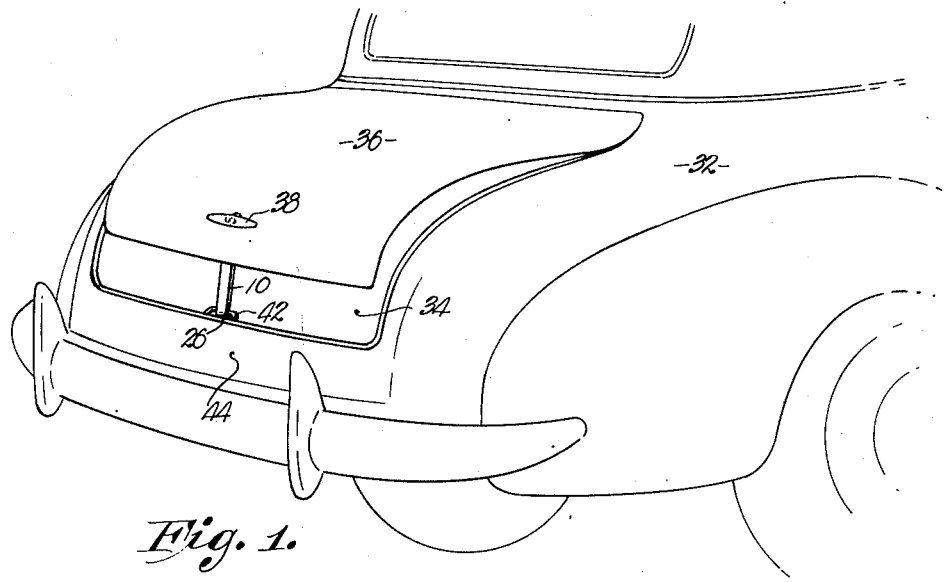
Fig. 1 is a fragmentary, rear perspective view of an automobile showing the trunk and lid thereof with the latter partially open and with one form of the lockable trunk lid extension forming the subject matter hereof operably in place.
Figure 2:
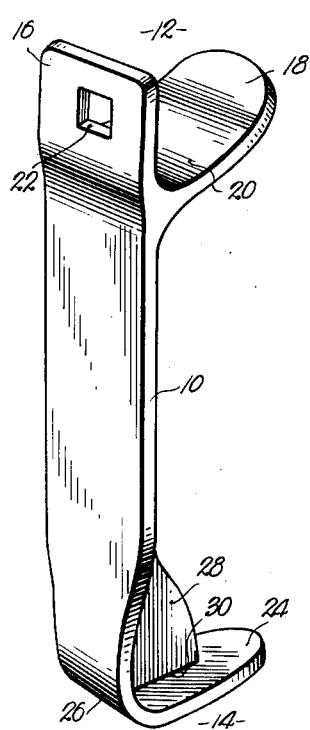
Fig. 2 is a perspective view of the lid extension shown in Fig. 1.

Figs. 5 to 8 inclusive are each perspective views showing four additional modifications of the device, each adaptable for use upon differing models of automobiles as hereinafter set forth.

In the form of my invention, illustrated in Figs. 1 to 4 inclusive, an elongated, preferably flat, relatively strong bar 10 is made of metal or other suitable material. Hook elements 12 and 14 are provided on opposite ends of the bar 10 respectively. Hook element 12 comprises a pair of fingers 16 and 18, the former actually constituting a continuation of the bar 10 but slightly offset with respect thereto.

The finger 18 is slightly arcuate and extends laterally from one face of the bar 10, terminating at its outermost free end slightly inwardly with respect to a plane through the free end of finger 16, perpendicular to the longitudinal axis of bar 10.

Finger 18 may be rounded at its free end as shown or otherwise formed, but extends in a relatively flat portion 20, adjacent the bar 10. Finger 18 may be either integrally cast or molded with the bar 10, or affixed thereto by welding or other means. A substantially centrally disposed opening 22 is provided in the finger 16.

Figure 3:
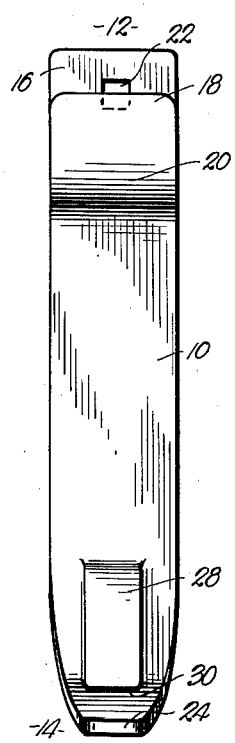
Fig. 3 is a side elevational view thereof.

The hook element 14 includes a finger 24 that is preferably an integral part of the bar 10 and extends laterally in the same direction from bar 10 as the finger 18. Finger 24 is formed by bending the bar 10 at 26 and is substantially perpendicular to the longitudinal axis of bar 10. That end of the bar 10, adjacent the finger 24 is of a reduced width, the longitudinal edges of such end of bar 10 converging as the finger 24 is approached and continuing in such converged manner toward the outermost free rounded end of finger 24. A substantially triangular shaped boss 28 is cast or welded upon that face of the bar 10 from which fingers 18 and 24 project. The boss 28 is of less thickness than the width of the bar 10 as shown in Fig. 3 and has one of its edges 30 spaced slightly from the proximal or innermost face of the finger 24. Boss 28 extends only a slight distance beyond the face of bar 10, upon which it is mounted, as compared with the length of finger 24.

The device just described is adapted for use with an automobile 32 shown in part in Fig. 1, having the usual trunk compartment 34 that is, in turn, provided with a lid 36. As is well known, lid 36 is swingable to and from a closed position through the provision of suitable hinges not shown. Lid 36 is also provided with a lock having a handle 38 and a retractable bolt 40. When lid 36 is in the fully closed position, actuation of handle 38 will withdraw the bolt 40 from a bracket 42, mounted upon body portion 44 of the automobile 32. When the bolt 40 is interlocked with the bracket 42 through use of a key, lid 36 may be fully locked against opening by intruders. The extension device hereof and above described is adapted to span the distance between the bolt 40 of lid 36 and the bracket 42 when it is desired to maintain lid 36 in the partially open condition shown in Fig. 1.

Figure 4:
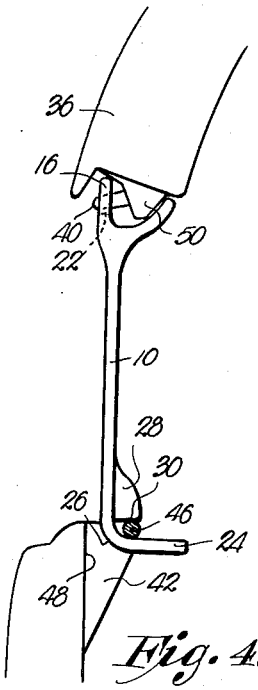
Fig. 4 is an edge elevational view showing the same in use.

Bracket 42 is U-shaped, presenting a crossbar or bight portion 46, normally adapted to receive the bolt 40. When bar 10 is placed in use, the finger 24 is mounted upon the bracket 42 in looped relationship with respect to the bar 46. As shown in Fig. 4 of the drawing, finger 14 underlies bar 46 and extends inwardly toward the interior of trunk compartment 34. When bar 10 is thus in place the boss 28 overlies the bar 46, serving to prevent downward movement of bar 10 while finger 24 holds the bar 10 against longitudinal upward movement. It is to be noted that bar 10 cannot be removed or inserted into the bracket 42 unless the same is first held at an angle with respect to the vertical. Actually, if bar 10 should shift from the position shown in Fig. 4 with the finger 24 moving horizontally, the rearmost face of bar 10, adjacent rounded portion 26 would strike a portion 48 of body 44 and prevent displacement of the bar 10. The lowermost edge 30 of boss 28 would still overlie the bight member 46 and hold the bar 10 in place.

The hook element 12 is adapted for interlocking with the lid 36 in a similar fashion. Lid 36 is provided with a housing 50 formed to enclose a part of the lock mechanism, including bolt 40, and particularly for mounting retractable bolt 40. It is noted as shown in Fig. 4 that the finger 18 underlies the housing portion 50 and conforms in contour therewith, thereby serving as a support for lid 36. Through actuation of handle 38, bolt 40 can be held in the retracted position until such time as loop element 12 is in place, whereupon bolt 40 is permitted to pass into the opening 22 of finger 16. With finger 18 holding bar 10 against swinging movement outwardly with respect to lid 36, finger 16 and bolt 40 cooperate in locking that end of bar 10 having loop element 12 thereon to the lid 36.

It is apparent that the length of the bar 10 may vary, depending upon the extent of opening at which the user desires to hold lid 36. Normally, in transporting animals, lid 36 need only be opened a relatively short distance to permit sufficient air to enter the compartment 34. It is seen that such animal cannot escape and that lid 36 will not become displaced while in transit. Furthermore, the automobile may be left ungarded at any time without fear of unwarranted entrance to the compartment 34 if the lock key is used in the usual manner to lock handle 38 against movement to retract bolt 40.

In the same manner, the extension device may be used at any time when it is desired, to hold lid 36 partially open such as when articles within the compartment 34 are too large to permit full closure of lid 36.

It is now apparent that the device illustrated in Figs. 1 to 4 inclusive, while disclosing fully the spirit of this invention cannot be adapted in its precise form to all types of automobiles. The lock assembly for trunks as well as the trunk compartments and lids therefor, vary quite extensively among differing makes of automobiles and differing models thereof. For purposes of explanation, the device of the form above described is adaptable for use with 1949 Chevrolets, Oldsmobiles, Pontiacs and perhaps others.

Figure 5:
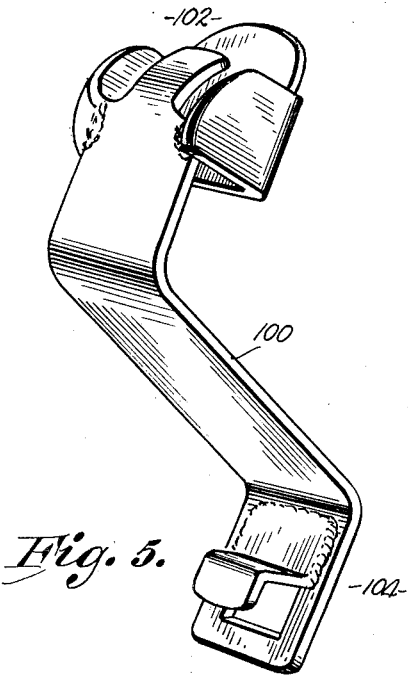

The four forms of my invention illustrated in Figs. 5 to 8 inclusive teach the way in which the extension can be modified for adaptation to differing automobiles. For instance, in Fig. 5 is illustrated a similar device formed to serve the same function as above described when used with 1949 Ford automobiles. A bar 100 has hook elements 102 and 104 on opposite ends thereof respectively. The hook element 102, while varying somewhat from the element 12 above mentioned is adaptable for receiving the bolt part of the locking assembly of this particular model of automobile. Similarly the hook element 104 is adapted to interlock with that part of the lock that is rigidly secured to the automobile body, adjacent the trunk compartment. The modified form of my device, shown in Fig. 5 will operate in the same manner as above mentioned in holding the trunk lid open and in preventing movement of the lid in either direction when locked therewith.

Figure 6:
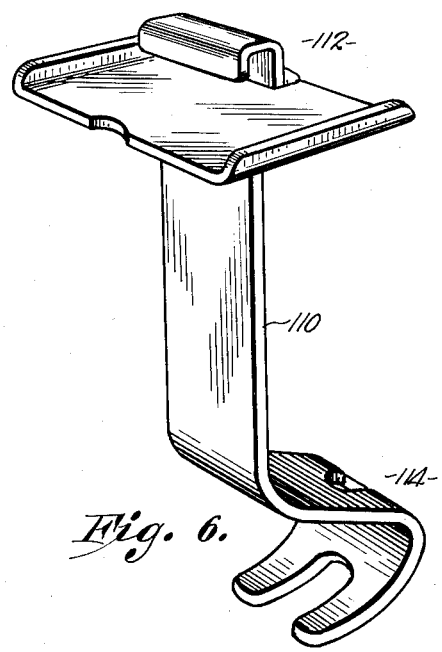

In Fig. 6, a bar 110 has hook elements 112 and 114 respectively at opposed ends thereof. The form of my device shown in Fig. 6 is adaptable for a large number of automobiles including Plymouth, Dodge, De Soto and Chrysler commencing with 1940 models through 1948 models.

Figure 7:
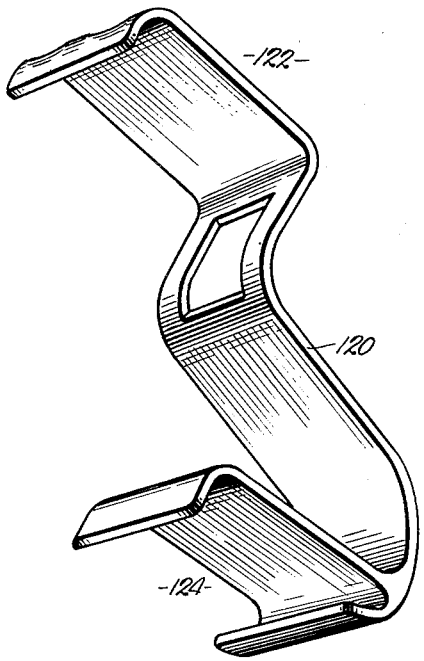

Chevrolets dating from 1940 to 1948 are provided with trunk compartments, lids and locking assemblies therefor that require a device such as shown in Fig. 7 to accomplish the purpose of this invention. Such device includes a bar portion 120 having hook elements 122 and 124 respectively at the ends thereof.

Figure 8:
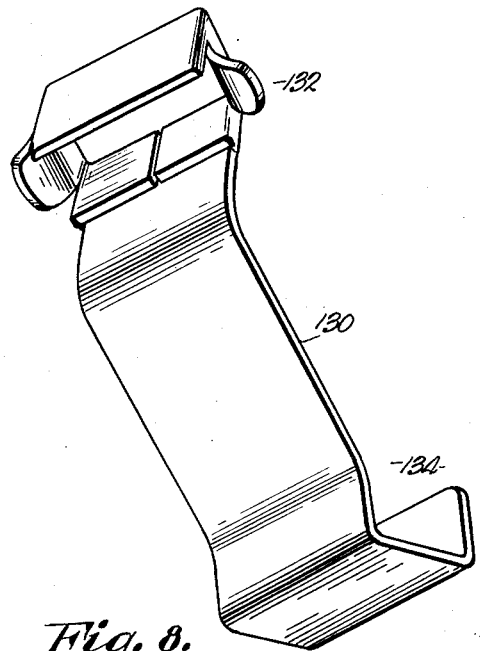

Finally, a slightly differing form of my invention is needed for 1949 Plymouths, Dodges and De Sotos such as is shown in Fig. 8. A bar 130 has hook elements 132 and 134 at opposite ends thereof for receiving that part of the locking assembly on the trunk lid and on the automobile respectively.

It may be found also that the five forms herein described may be used in the same manner with other models and types of automobiles with little if any additional modification. It is apparent further that there are many automobiles still on the market and yet to be introduced to the market that are capable of accommodating the devices herein shown only after further modification thereof.

Manifestly it is impractical to illustrate all of such forms and therefore a few only of the possible modifications have been illustrated in order to adequately teach the changes that can be made over and above the form fully illustrated in Figs. 1 to 4 inclusive.

It is clear from the foregoing therefore that a multitude of changes and modifications in the forms of my invention herein disclosed may be made within the spirit of this invention and it is

Having thus described the invention, what is claimed as new and desired to be secured by Letters Patent is:

1. For an automobile having structure forming a trunk compartment, a lid for said compartment, and a lock for the lid including a part on the lid having a retractable element, and a rod on said structure normally receiving said element when the lid is locked in a closed condition, a device for maintaining said lid locked in a predetermined, partially open position, said device comprising an elongated bar, the normally uppermost end of said bar being substantially Y-shaped, presenting an upwardly facing cradle for receiving said part of the lock, said cradle having a pair of fingers, one of the fingers having an opening formed therein for receiving said element to hold said part of the lock within the cradle, the normally lowermost end of the bar being L-shaped, presenting a third finger adapted for looped engagement with said rod therebeneath, said third finger lying substantially in the plane of the Y-shaped portion and extending in the direction of the unperforated finger of the Y-shaped portion; and means on the bar and disposed for engagement with the rod thereabove for holding said third finger against downward movement away from the rod.

2. For an automobile having structure forming a trunk compartment, a lid for said compartment, and a lock for the lid including a part on the lid having a retractable element, and a rod on said structure normally receiving said element when the lid is locked in a closed condition, a device for maintaining said lid locked in a predetermined, partially open position, said device comprising an elongated bar, the normally uppermost end of said bar being substantially Y-shaped, presenting an upwardly facing cradle for receiving said part of the lock, said cradle having a pair of fingers, one of the fingers having an opening formed therein for receiving said element to hold said part of the lock within the cradle, the normally lowermost end of the bar being L-shaped, presenting a third finger adapted for looped engagement with said rod therebeneath, said third finger lying substantially in the plane of the Y-shaped portion and extending in the direction of the unperforated finger of the Y-shaped portion; and a boss on one face of the bar, spaced above said third finger, and extending laterally from said one face of the bar for engaging the rod thereabove to hold the third finger against downward movement away from the rod.

WALTER D. GARDELS.

REFERENCES CITED

The following references are of record in the file of this patent:

UNITED STATES PATENTS

| Number | Name | Date |
| --- | --- | --- |
| 683,321 | Neubauer et al. | Sept. 24, 1901 |
| 965,987 | Cavileer | Aug. 2, 1910 |
| 1,003,389 | Winter | Sept. 12, 1911 |
| 1,186,322 | Lyons | June 6, 1916 |
| 1,562,972 | Kohnert | Nov. 24, 1925 |
| 1,639,870 | Valsvig | Aug. 23, 1927 |
| 2,117,072 | Woods | May 10, 1938 |
| 2,199,369 | Bernstein | Apr. 30, 1940 |
| 2,504,367 | Willink | Apr. 18, 1950 |